US008450028B2

(12) United States Patent
Takemori et al.

(10) Patent No.: US 8,450,028 B2
(45) Date of Patent: May 28, 2013

(54) HOLOGRAPHIC STORAGE METHOD

(75) Inventors: Michael T. Takemori, Rexford, NY (US); Mark A. Cheverton, Mechanicville, NY (US); Andrew A. Burns, Niskayuna, NY (US); Sumeet Jain, Schenectady, NY (US)

(73) Assignee: Sabic Innovative Plastics IP B.V. (NL)

( * ) Notice: Subject to any disclaimer, the term of this patent is extended or adjusted under 35 U.S.C. 154(b) by 100 days.

(21) Appl. No.: 13/074,374

(22) Filed: Mar. 29, 2011

(65) Prior Publication Data

US 2012/0250119 A1  Oct. 4, 2012

(51) Int. Cl.
*G03H 1/02* (2006.01)

(52) U.S. Cl.
USPC .................. 430/1; 430/2; 430/394; 359/3

(58) Field of Classification Search
None
See application file for complete search history.

(56) References Cited

U.S. PATENT DOCUMENTS

| | | | | |
|---|---|---|---|---|
| 3,668,663 A * | 6/1972 | Chandross et al. | ........... | 365/119 |
| 3,850,633 A | 11/1974 | Moraw et al. | | |
| 4,186,002 A * | 1/1980 | Heller et al. | ...................... | 430/1 |
| 4,815,800 A * | 3/1989 | Chern et al. | ...................... | 359/3 |
| 4,818,045 A * | 4/1989 | Chang | .............................. | 359/15 |
| 4,988,151 A * | 1/1991 | Moss | ................................. | 359/9 |
| 5,384,221 A * | 1/1995 | Savant et al. | .................... | 430/19 |
| 5,792,545 A * | 8/1998 | Kawai et al. | ................... | 428/153 |
| 6,924,082 B1 * | 8/2005 | Hansen | .................... | 430/270.15 |
| 2001/0002895 A1 * | 6/2001 | Kawano et al. | ............... | 369/103 |
| 2004/0240012 A1 * | 12/2004 | Yasuda et al. | ................... | 359/24 |
| 2005/0013231 A1 * | 1/2005 | Kawano et al. | ............... | 369/103 |
| 2006/0109531 A1 | 5/2006 | Watanabe et al. | | |
| 2006/0194122 A1 * | 8/2006 | Takizawa | .......................... | 430/1 |
| 2007/0127329 A1 * | 6/2007 | Erben et al. | ................ | 369/44.26 |
| 2007/0236763 A1 * | 10/2007 | Minabe et al. | .................... | 359/1 |
| 2008/0085455 A1 | 4/2008 | McLaughlin et al. | | |
| 2009/0001632 A1 * | 1/2009 | Stumpe et al. | ................ | 264/334 |
| 2010/0328741 A1 | 12/2010 | Cheverton et al. | | |

FOREIGN PATENT DOCUMENTS

| | | | |
|---|---|---|---|
| JP | 59-009920 | * | 1/1984 |
| WO | WO2009030502 A1 | | 3/2009 |

OTHER PUBLICATIONS

International Search Report for PCT/US2012/031183 mailed Jun. 15, 2012, 5 pages.
Written Opinion of the International Searching Authority for PCT/US2012/031183 mailed Jun. 15, 2012, 9 pages.

* cited by examiner

*Primary Examiner* — Martin Angebranndt
(74) *Attorney, Agent, or Firm* — Cantor Colburn LLP

(57) ABSTRACT

A method of recording a volume holographic image is described in which a holographic recording medium containing a photoreactive dye is exposed to a plurality of coherent light sources emitting at a wavelength to which the dye is sensitive, thereby forming an interference fringe pattern therein. The photoreaction occurring in the areas of constructive interference generates a periodic array of photoreacted areas of the dye and unreacted areas of the dye. This generated interference fringe pattern may contain, but does not have to contain any image or other encoded information. Selected areas of the interference fringe pattern are then exposed to actinic radiation in such a manner to partially or fully bleach, remove, or deactivate the photoreactive dye fringe pattern, thereby producing a holographic pattern, shape, or image formed by areas of the interference fringe pattern that were not bleached, removed, or deactivated.

28 Claims, 6 Drawing Sheets

HOLOGRAPHIC STORAGE METHOD

BACKGROUND

The present disclosure relates to articles that incorporate holograms, more particularly volume transmission and reflection holograms. Methods of making and using the same are also disclosed.

Holograms are an increasingly popular mechanism for the authentication of genuine articles, whether it is for security purposes or for brand protection. The use of holograms for these purposes is driven primarily by the relative difficulty with which they can be duplicated. Holograms are created by interfering two coherent beams of light to create an interference pattern and storing that pattern in a holographic recording medium. Information or imagery can be stored in a hologram by imparting the data or image to one of the two coherent beams prior to their interference. The hologram can be read out by illuminating it with beams matching either of the two original beams used to create the hologram and any data or images stored in the hologram will be displayed. As a result of the complex methods required to record holograms, their use for authentication can be seen on articles such as credit cards, software, passports, clothing, and the like. In addition, the inherent properties of holograms (vivid coloration, 3-dimensional effects, angular selectivity, etc.) have long attracted the interest of artists and advertisers as a medium for generating eye-catching displays for commercial or private use.

Two categories of holograms include surface relief structure holograms and volume holograms. Many of the holograms used in display, security or authentication applications are of the surface relief type, in which the pattern and any data or image contained therein is stored in the structure or deformations imparted to the surface of the recording medium. While the initial holograms may be created by the interference of two coherent beams, duplicates can be created by copying the surface structure using techniques such as embossing. The duplication of holograms is convenient for the mass production of articles such as credit cards or security labels, but it also has the disadvantage that it makes the unauthorized duplication and/or modification of these holograms for use in counterfeit parts possible from the originals using the same mechanism.

Unlike surface holograms, volume holograms are formed in the bulk of a recording medium. Volume holograms have the ability to be multiplexed, storing information at different depths and different angles within the bulk recording material and thus have the ability to store greater amounts of information. In addition, because the pattern which makes up the hologram is embedded, copying cannot be done using the same techniques as for surface relief holograms. In addition, surface holograms are inherently polychromatic (rainbow-appearance), while volume holograms are capable of both monochromatic (at a desired wavelength) as well as polychromatic (either multicolored or rainbow-appearance), which enables greater control of the aesthetic features of volume holograms for display applications versus surface holograms.

While volume holograms can provide greater security against counterfeit duplication and greater aesthetic breadth than surface relief structure holograms, they generally require vibration-isolated, temperature-controlled recording equipment that must be maintained at physical tolerances of less than the writing light wavelength, typically on the order of hundreds of nanometers (e.g., 405 nm) in order to record well-defined, high diffraction efficiency holograms. Additionally, the laser sources, especially those used for traditional transmission holography in thick materials, must have long coherence lengths (e.g., centimeters to meters). All of this contributes to relatively high equipment costs for recording volume holograms. Accordingly, volume holograms have proven to be more time-consuming and expensive to mass produce because in many cases each holographic article must be individually exposed with interfering signal and reference light sources in order to produce the interference fringe patterns to create the holographic image. Mass production is even more problematic if it is desired to individualize or personalize individual holographic images, as the signal light source must be provided with different image information for each individualized holographic recording, which adds to the time, expense, and complexity of the holographic recording process. For example, individualized information such as photos, logos, serial numbers, images, and the like is often collected and/or maintained in a decentralized fashion at disparate locations, which would then require holographic recording equipment to be maintained and operated at a number of different locations, further adding to the required time, capital expense, and complexity.

Accordingly, there exists a need for new techniques for recording volume holograms that offer improved efficiency and/or lower cost. There also remains a need for new techniques for recording volume holograms with individualized images, information, or characteristics at improved efficiency and/or lower cost.

SUMMARY

In an exemplary embodiment, a method of recording a volume holographic image is described. According to this method, a holographic recording medium comprising a photoreactive dye is exposed to a plurality of coherent light sources emitting light at a wavelength to which the photoreactive dye is sensitive, thereby forming an interference fringe pattern therein. The photoreaction occurring in the volumes of constructive interference generates a periodic array of photoreacted areas of the photoreactive dye and unreacted areas of the photoreactive dye. This generated interference fringe pattern does not need to contain any image or other encoded information, although it may contain an image or other encoded information. Selected areas of the interference fringe pattern are then exposed to actinic radiation in such a manner to partially or fully bleach, remove, or deactivate the photoreactive dye fringe pattern, thereby producing a holographic pattern, shape, or image formed by areas of the interference fringe pattern that were not bleached, removed, or deactivated. In an exemplary embodiment, the resulting holographic recording medium is stabilized towards further actinic radiation exposure to prevent degradation of the recorded interference fringe patterns.

BRIEF DESCRIPTION OF THE DRAWINGS

Referring now to the Figures, which represent exemplary embodiments and wherein like elements may be numbered alike.

DETAILED DESCRIPTION

Figure 1:
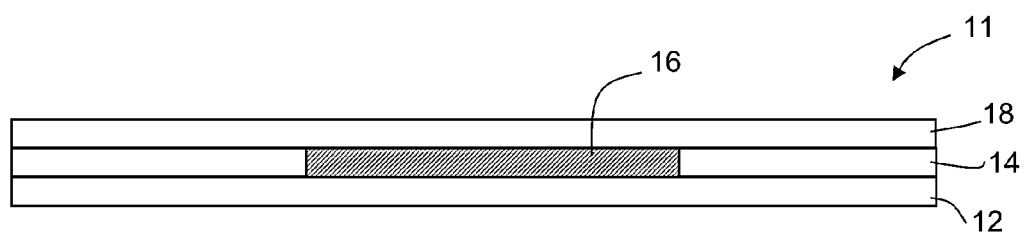
FIG. 1 represents an exemplary structure of an article for recording and displaying a holographic image.

In an exemplary embodiment, the holographic recording medium disclosed herein comprises a transparent polymeric binder with a photoreactive dye dispersed therein. The polymeric binder may be a thermoplastic polymer, thermosetting polymer, or a combination comprising one or more of such polymers. The polymers can be oligomers, polymers, dendrimers, ionomers, copolymers such as for example, block copolymers, random copolymers, graft copolymers, star block copolymers; or the like, or a combination comprising at least one of the foregoing polymers. Exemplary thermoplastic organic polymers that can be used in the binder composition include, without limitation, polyacrylates, polymethacrylates, polyesters (e.g., cycloaliphatic polyesters, resorcinol arylate polyester, and so forth), polyolefins, polycarbonates, polystyrenes, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyether amides, polyether esters, or the like, or a combination comprising at least one of the foregoing thermoplastic polymers (either in admixture or co- or graft-polymerized), such as polycarbonate and polyester.

Exemplary polymeric binders are described herein as "transparent". Of course, this does not mean that the polymeric binder does not absorb any light of any wavelength. Exemplary polymeric binders need only be reasonably transparent in wavelengths for exposure and viewing of a holographic image so as to not unduly interfere with the formation and viewing of the image. In an exemplary embodiment, the polymer binder has an absorbance in the relevant wavelength ranges of less than 0.2. In another exemplary embodiment, the polymer binder has an absorbance in the relevant wavelength ranges of less than 0.1. In yet another exemplary embodiment, the polymer binder has an absorbance in the relevant wavelength ranges of less than 0.01. Organic polymers that are not transparent to electromagnetic radiation can also be used in the binder composition if they can be modified to become transparent. For examples, polyolefins are not normally optically transparent because of the presence of large crystallites and/or spherulites. However, by copolymerizing polyolefins, they can be segregated into nanometer-sized domains that cause the copolymer to be optically transparent.

In one embodiment, the organic polymer and photochromic dye can be chemically attached. The photochromic dye can be attached to the backbone of the polymer. In another embodiment, the photochromic dye can be attached to the polymer backbone as a substituent. The chemical attachment can include covalent bonding, ionic bonding, or the like.

Examples of cycloaliphatic polyesters for use in the binder composition are those that are characterized by optical transparency, improved weatherability and low water absorption. It is also generally desirable that the cycloaliphatic polyesters have good melt compatibility with the polycarbonate resins since the polyesters can be mixed with the polycarbonate resins for use in the binder composition. Cycloaliphatic polyesters are generally prepared by reaction of a diol (e.g., straight chain or branched alkane diols, and those containing from 2 to 12 carbon atoms) with a dibasic acid or an acid derivative.

Polyarylates that can be used in the binder composition refer to polyesters of aromatic dicarboxylic acids and bisphenols. Polyarylate copolymers include carbonate linkages in addition to the aryl ester linkages, known as polyester-carbonates. These aryl esters may be used alone or in combination with each other or more particularly in combination with bisphenol polycarbonates. These organic polymers can be prepared, for example, in solution or by melt polymerization from aromatic dicarboxylic acids or their ester forming derivatives and bisphenols and their derivatives.

Blends of organic polymers may also be used as the binder composition for the holographic devices. Specifically, organic polymer blends can include polycarbonate (PC)-poly (1,4-cyclohexane-dimethanol-1,4-cyclohexanedicarboxylate) (PCCD), PC-poly(cyclohexanedimethanol-co-ethylene terephthalate) (PETG), PC-polyethylene terephthalate (PET), PC-polybutylene terephthalate (PBT), PC-polymethylmethacrylate (PMMA), PC-PCCD-PETG, resorcinol aryl polyester-PCCD, resorcinol aryl polyester-PETG, PC-resorcinol aryl polyester, resorcinol aryl polyester-polymethylmethacrylate (PMMA), resorcinol aryl polyester-PCCD-PETG, or the like, or a combination comprising at least one of the foregoing.

Binary blends, ternary blends and blends having more than three resins may also be used in the polymeric alloys. When a binary blend or ternary blend is used in the polymeric alloy, one of the polymeric resins in the alloy may comprise about 1 to about 99 weight percent (wt %) based on the total weight of the composition. Within this range, it is generally desirable to have the one of the polymeric resins in an amount greater than or equal to about 20, preferably greater than or equal to about 30 and more preferably greater than or equal to about 40 wt %, based on the total weight of the composition. Also desirable within this range, is an amount of less than or equal to about 90, preferably less than or equal to about 80 and more preferably less than or equal to about 60 wt % based on the total weight of the composition. When ternary blends of blends having more than three polymeric resins are used, the various polymeric resins may be present in any desirable weight ratio.

Exemplary thermosetting polymers that may be used in the binder composition include, without limitation, polysiloxanes, phenolics, polyurethanes, epoxies, polyesters, polyamides, polyacrylates, polymethacrylates, or the like, or a combination comprising at least one of the foregoing thermosetting polymers. In one embodiment, the organic material can be a precursor to a thermosetting polymer.

As noted above, the photoactive material is a photochromic dye. The photochromic dye is one that is capable of being written and read by electromagnetic radiation. When exposed to electromagnetic radiation of the appropriate wavelength, the dye undergoes a chemical change in situ and does not rely on diffusion of a photoreactive species during exposure to generate refractive index contrast. In one exemplary embodiment, the photochromic dyes can be written and read using actinic radiation i.e., from about 350 to about 1,100 nanometers. In a more specific embodiment, the wavelengths at which writing and reading are accomplished may be from about 400 nanometers to about 800 nanometers. In one exemplary embodiment, the reading and writing and is accomplished at a wavelength of about 400 to about 600 nanometers. In another exemplary embodiment, the writing and reading are accomplished at a wavelength of about 400 to about 550 nanometers. In one specific exemplary embodiment, a holographic medium is adapted for writing at a wavelength of about 405 nanometers. In such a specific exemplary embodiment, reading may be conducted at a wavelength of about 532 nanometers, although viewing of holograms may be conducted at other wavelengths depending on the viewing and illumination angles, and the diffraction grating spacing and angle. Examples of photochromic dyes include diarylethenes, dinitrostilbenes and nitrones.

An exemplary diarylethylene compound can be represented by formula (XI):

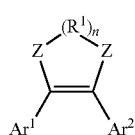
(XI)

wherein n is 0 or 1; $R^1$ is a single covalent bond ($C_0$), $C_1$-$C_3$ alkylene, $C_1$-$C_3$ perfluoroalkylene, oxygen; or —N(CH$_2$)$_x$CN wherein x is 1, 2, or 3; when n is 0, Z is $C_1$-$C_5$ alkyl, $C_1$-$C_5$ perfluoroalkyl, or CN; when n is 1, Z is CH$_2$, CF$_2$, or C=O; $Ar^1$ and $Ar^2$ are each independently i) phenyl, anthracene, phenanthrene, pyridine, pyridazine, 1H-phenalene or naphthyl, substituted with 1-3 substituents wherein the substituents are each independently $C_1$-$C_3$ alkyl, $C_1$-$C_3$ perfluoroalkyl, or fluorine; or ii) represented by following formulas:

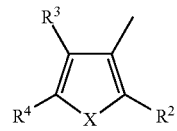
(XII)

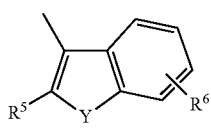
(XIII)

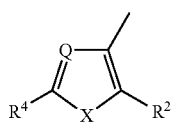
(XIV)

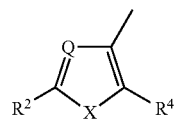
(XV)

wherein $R^2$ and $R^5$ are each independently $C_1$-$C_3$ alkyl or $C_1$-$C_3$ perfluoroalkyl; $R^3$ is $C_1$-$C_3$ alkyl, $C_1$-$C_3$ perfluoroalkyl, hydrogen, or fluorine; $R^4$ and $R^6$ are each independently $C_1$-$C_3$ alkyl, $C_1$-$C_3$ perfluoroalkyl, CN, hydrogen, fluorine, phenyl, pyridyl, isoxazole, —CHC(CN)$_2$, aldehyde, carboxylic acid, —($C_1$-$C_5$ alkyl)COOH or 2-methylenebenzo[d][1,3]dithiole; wherein X and Y are each independently oxygen, nitrogen, or sulfur, wherein the nitrogen is optionally substituted with $C_1$-$C_3$ alkyl or $C_1$-$C_3$ perfluoroalkyl; and wherein Q is nitrogen.

Examples of diarylethenes that can be used as photoactive materials include diarylperfluorocyclopentenes, diarylmaleic anhydrides, diarylmaleimides, or a combination comprising at least one of the foregoing diarylethenes. The diarylethenes are present as open-ring or closed-ring isomers. In general, the open ring isomers of diarylethenes have absorption bands at shorter wavelengths. Upon irradiation with ultraviolet light, new absorption bands appear at longer wavelengths, which are ascribed to the closed-ring isomers. In general, the absorption spectra of the closed-ring isomers depend on the substituents of the thiophene rings, naphthalene rings or the phenyl rings. The absorption structures of the open-ring isomers depend upon the upper cycloalkene structures. For example, the open-ring isomers of maleic anhydride or maleimide derivatives show spectral shifts to longer wavelengths in comparison with the perfluorocyclopentene derivatives.

Examples of diarylethene closed ring isomers include:

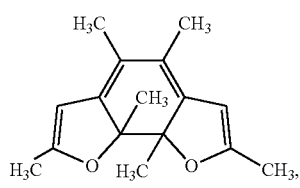
(XVI)

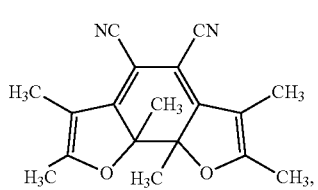
(XVII)

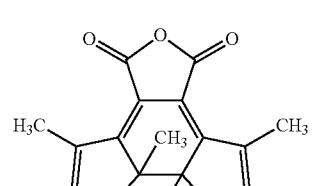
(XVIII)

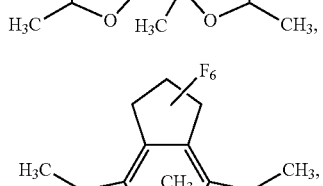
(XIX)

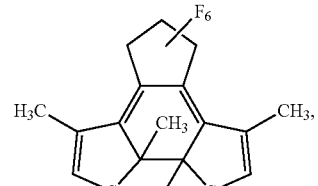
(XX)

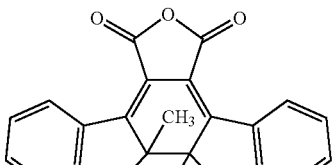
(XXI)

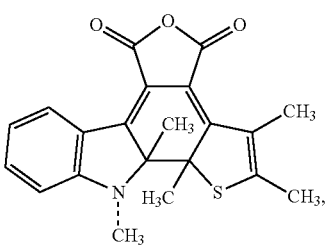
(XXII)
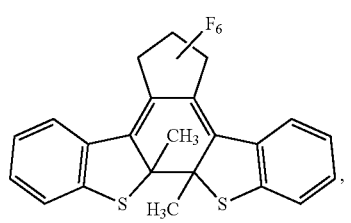
(XXIII)
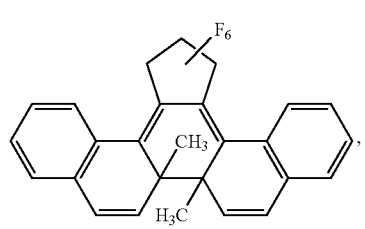
(XXIV)
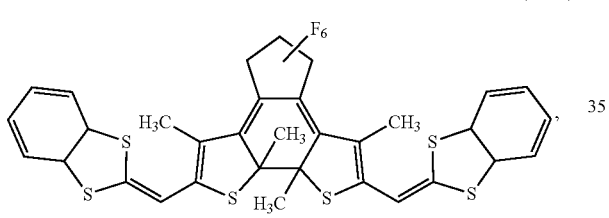
(XXV)
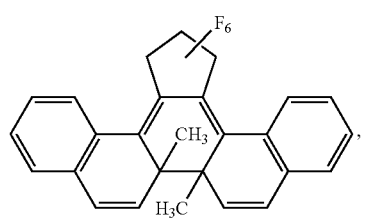
(XXVI)
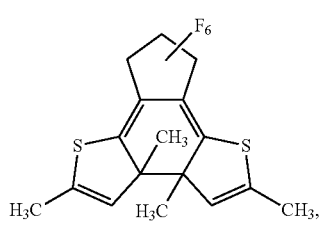
(XXVII)
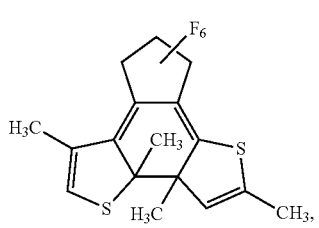
(XXVIII)
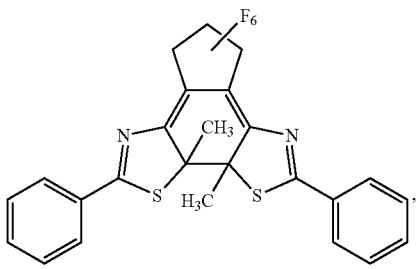
(XXIX)
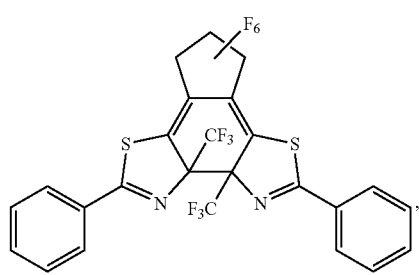
(XXX)
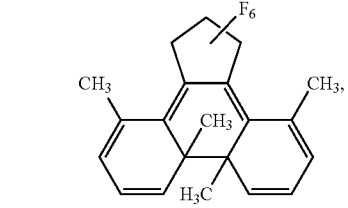
(XXXI)
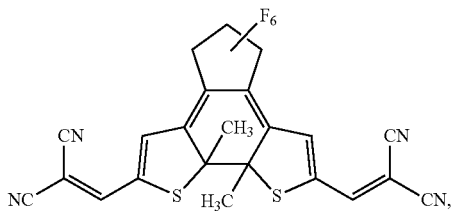
(XXXII)
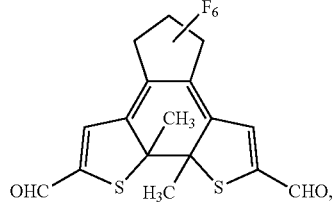
(XXXIII)
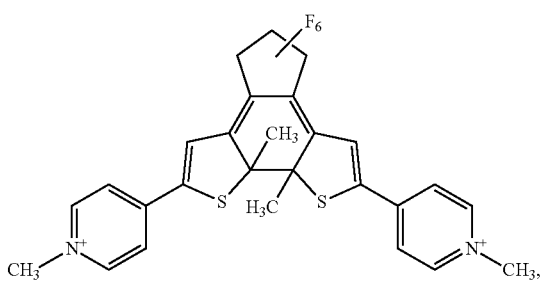
(XXXIV)

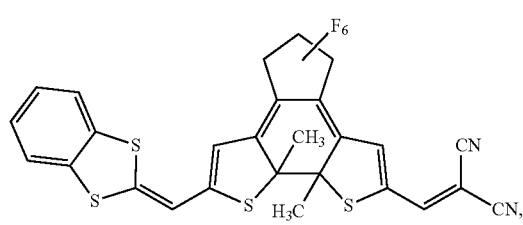
(XXXV)

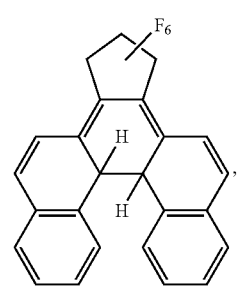
(XXXVI)

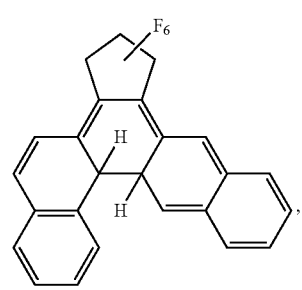
(XXXVII)

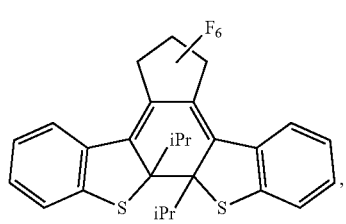
(XXXVIII)

where iPr represents isopropyl:

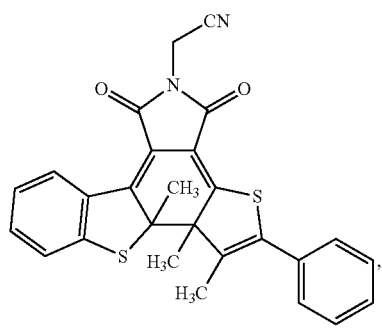
(XXXIX)

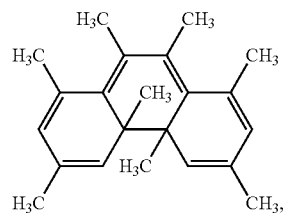
(XXXX)

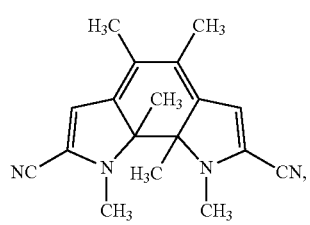
(XXXXI)

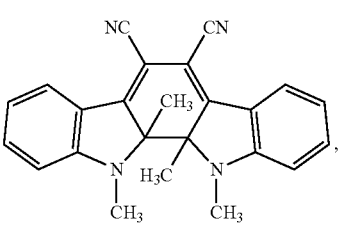
(XXXXII)

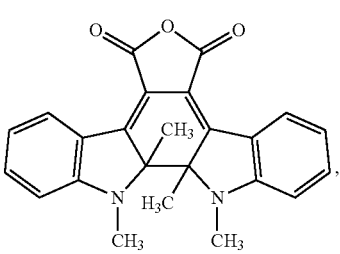
(XXXXIII)

and combinations comprising at least one of the foregoing diarylethenes.

Diarylethenes with five-membered heterocyclic rings have two conformations with the two rings in mirror symmetry (parallel conformation) and in $C_2$ (antiparallel conformation). In general, the population ratio of the two conformations is 1:1. In one embodiment, it is desirable to increase the ratio of the antiparallel conformation to facilitate an increase in the quantum yield, which is further described in detail below. Increasing the population ratio of the antiparallel conformation to the parallel conformation can be accomplished by covalently bonding bulky substituents such as the —($C_1$-$C_5$ alkyl)COOH substituent to diarylethenes having five-membered heterocyclic rings.

In another embodiment, the diarylethenes can be in the form of a polymer having the general formula (XXXXIV) below. The formula (XXXXIV) represents the open isomer form of the polymer.

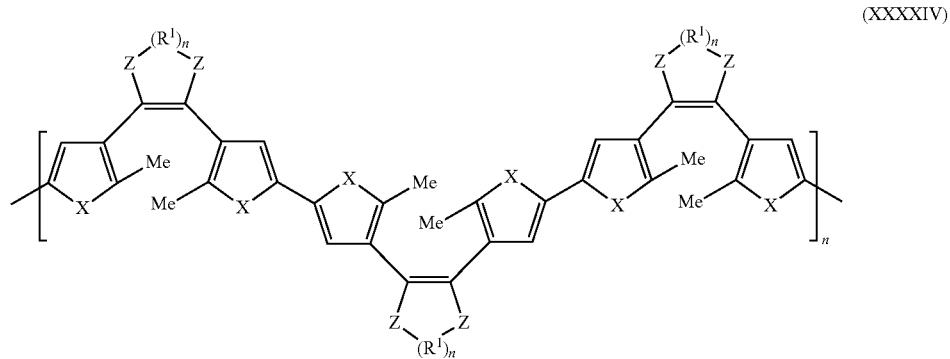

where Me represents methyl, $R^1$, X and Z have the same meanings as explained above in formulas (XI) through (XV) and n is any number greater than 1.

Polymerizing the diarylethenes can also be used to increase the population ratio of the antiparallel conformations to the parallel conformations.

The diarylethenes can be reacted in the presence of light. In one embodiment, an exemplary diarylethene can undergo a reversible cyclization reaction in the presence of light according to the following equation (I):

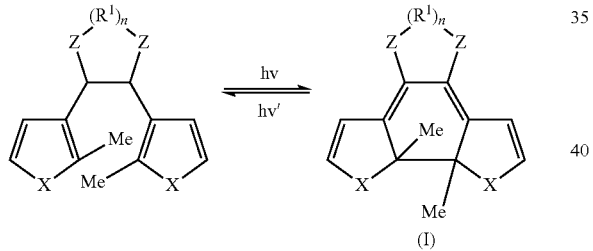

where X, Z $R^1$ and n have the meanings indicated above; and wherein Me is methyl. The cyclization reaction can be used to produce a hologram. The hologram can be produced by using radiation to react the open isomer form to the closed isomer form or vice-versa.

A similar reaction for an exemplary polymeric form of diarylethene is shown below in the equation (II)

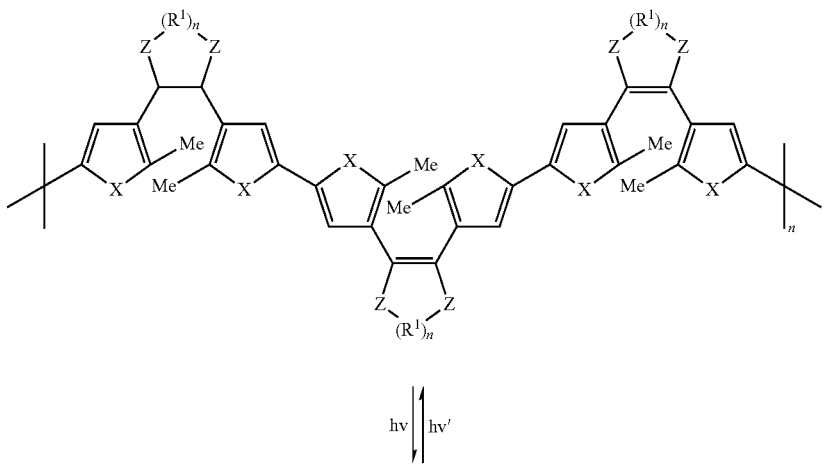

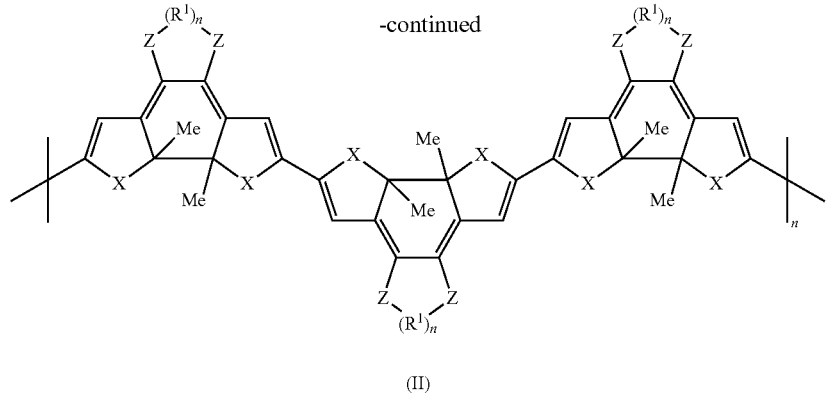

(II)

where X, Z R$^1$ and n have the meanings indicated above; and wherein Me is methyl.

Nitrones can also be used as photochromic dyes in the holographic storage media. Nitrones have the general structure shown in the formula (XXXXV):

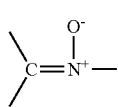

(XXXXV)

An exemplary nitrone generally comprises an aryl nitrone structure represented by the formula (XXXXVI):

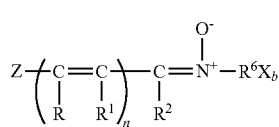

(XXXXVI)

wherein Z is (R$^3$)$_a$-Q-R$^4$— or R$^5$—; Q is a monovalent, divalent or trivalent substituent or linking group; wherein each of R, R$^1$, R$^2$ and R$^3$ is independently hydrogen, an alkyl or substituted alkyl radical containing 1 to about 8 carbon atoms or an aromatic radical containing 6 to about 13 carbon atoms; R$^4$ is an aromatic radical containing 6 to about 13 carbon atoms; R$^5$ is an aromatic radical containing 6 to about 20 carbon atoms which have substituents that contain hetero atoms, wherein the hetero atoms are at least one of oxygen, nitrogen or sulfur; R$^6$ is an aromatic hydrocarbon radical containing 6 to about 20 carbon atoms; X is a halo, cyano, nitro, aliphatic acyl, alkyl, substituted alkyl having 1 to about 8 carbon atoms, aryl having 6 to about 20 carbon atoms, carbalkoxy, or an electron withdrawing group in the ortho or para position selected from the group consisting of

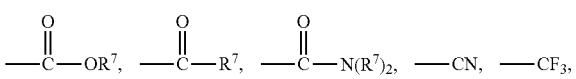

where R$^7$ is a an alkyl radical having 1 to about 8 carbon atoms; a is an amount of up to about 2; b is an amount of up to about 3; and n is up to about 4.

As can be seen from formula (XXXXVI), the nitrones may be α-aryl-N-arylnitrones or conjugated analogs thereof in which the conjugation is between the aryl group and an α-carbon atom. The α-aryl group is frequently substituted, most often by a dialkylamino group in which the alkyl groups contain 1 to about 4 carbon atoms. The R$^2$ is hydrogen and R$^6$ is phenyl. Q can be monovalent, divalent or trivalent according as the value of "a" is 0, 1 or 2. Illustrative Q values are shown in the Table 1 below.

TABLE 1

| Valency of Q | Identity of Q |
| --- | --- |
| Monovalent | fluorine, chlorine, bromine, iodine, alkyl, aryl; |
| Divalent | oxygen, sulphur, carbonyl, alkylene, arylene. |
| Trivalent | Nitrogen |

It is desirable for Q to be fluorine, chlorine, bromine, iodine, oxygen, sulfur or nitrogen.

Examples of nitrones are α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-[2-(1,1-diphenylethenyl)]-N-phenylnitrone, α-[2-(1-phenylpropenyl)]-N-phenylnitrone, or the like, or a combination comprising at least one of the foregoing nitrones. Aryl nitrones are particularly useful in the compositions and articles disclosed herein. An exemplary aryl nitrone is α-(4-diethylaminophenyl)-N-phenylnitrone.

Upon exposure to electromagnetic radiation, nitrones undergo unimolecular cyclization to an oxaziridine as shown in the structure (XXXXVII)

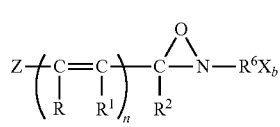

(XXXXVII)

wherein R, R$^1$, R$^2$, R$^6$, n, X$_b$ and Z have the same meaning as denoted above for the structure (XXXXVI).

Nitrostilbenes and nitrostilbene derivatives may also be used as photoreactive dyes for recording interference fringe patterns, as disclosed for example by C. Erben et al., "Ortho-Nitrostilbenes in Polycarbonates for Holographic Data Storage," *Advanced Functional Materials*, 2007, 17, 2659-66, and in U.S. Pat. App. Publ. No. 2008/0085492 A1, the disclosures of which are incorporated herein by reference in their entirety. Specific examples of such dyes include 4-dimethylamino-2',4'-dinitrostilbene, 4-dimethylamino-4'-cyano-2'-nitrostilbene, 4-hydroxy-2',4'-dinitrostilbene, and 4-methoxy-2',4'-dinitrostilbene. These dyes have been synthesized and optically induced rearrangements of such dyes have been studied in the context of the chemistry of the reactants and products as well as their activation energy and entropy factors. J. S. Splitter and M. Calvin, "The Photochemical Behavior of Some o-Nitrostilbenes," *J. Org. Chem.*, vol. 20, pg. 1086 (1955). More recent work has focused on using the refractive index modulation that arises from these optically induced changes to write waveguides into polymers doped with the dyes. McCulloch, I. A., "Novel Photoactive Nonlinear Optical Polymers for Use in Optical Waveguides," *Macromolecules*, vol. 27, pg. 1697 (1994).

In addition to the binder and the photoreactive dye, the holographic recording medium may include any of a number of additional components, including but not limited to heat stabilizers, antioxidants, light stabilizers, plasticizers, anti-static agents, mold release agents, additional resins, binders, and the like, as well as combinations of any of the foregoing components.

In one exemplary embodiment, the holographic recording medium is extruded as a relatively thin layer or film, e.g., having a thickness of 0.5 to 1000 microns. In another exemplary embodiment, a layer or film of the holographic recording medium is coated onto, co-extruded with, or laminated with a support. The support may be a planar support such as a film or card, or it may be virtually any other shape as well. In yet another exemplary embodiment, the holographic medium may be molded or extruded into virtually any shape capable of being fabricated by plastic manufacturing technologies such as solvent-casting, film extrusion, biaxial stretching, injection molding and other techniques known to those skilled in the art. Still other shapes may be fabricated by post-molding or post-extrusion treatments such as cutting, grinding, polishing, and the like.

The techniques described herein are useful with photoreactive dye-based holographic recording materials, but they may also be used with any non-diffusion based holographic recording medium capable of forming volume holograms. A non-diffusion based holographic recording medium is defined as any holographic recording medium where the refractive index change required to record a hologram is generated by the reaction in situ of the photo reactive species upon exposure of the holographic recording medium to actinic radiation, and does not rely on the diffusion of photoreactive species during the hologram exposure to generate refractive index contrast. One common diffusion based holographic recording medium is based on photopolymers that consume monomer as they are reacted with light, causing monomer in the recording medium to diffuse from unexposed regions to exposed regions of the recording medium, generating refractive index contrast. Examples of non-diffusion based holographic recording materials include the above-described photoreactive dye-based recording materials, dichromated gelatin, and silver halide emulsions. For dichromated gelatin and silver halide emulsions, the bleaching, removing, and/or deactivating of selected areas of the interference fringe pattern would typically be performed after exposure, but before other steps, such as removal of unreacted DCG or development/fixing of a latent silver halide image.

Turning now to FIG. 1, an exemplary structure of an article for recording and displaying a holographic image is shown. In this exemplary embodiment, an article 11 comprises a support layer 12 having thereon a layer of holographic recording medium 14 and a top-coat layer 18. A holographic image 16 is shown recorded in the holographic recording medium 14. The support layer 12 should be transparent if the holographic image 16 is a transmission hologram, or it may be transparent or opaque if the holographic image 16 is a reflection hologram. The top-coat layer 18 should be transparent. Either or both of the support layer 12 and the top-coat layer 18 may include one or more light-blocking moieties to help stabilize the holographic image 16. The support may be a planar support such as a film or card, or it may be virtually any other shape as well. Exemplary supports and top-coat materials may include any of the same materials described above for use as a binder for the holographic recording medium.

Figure 2:
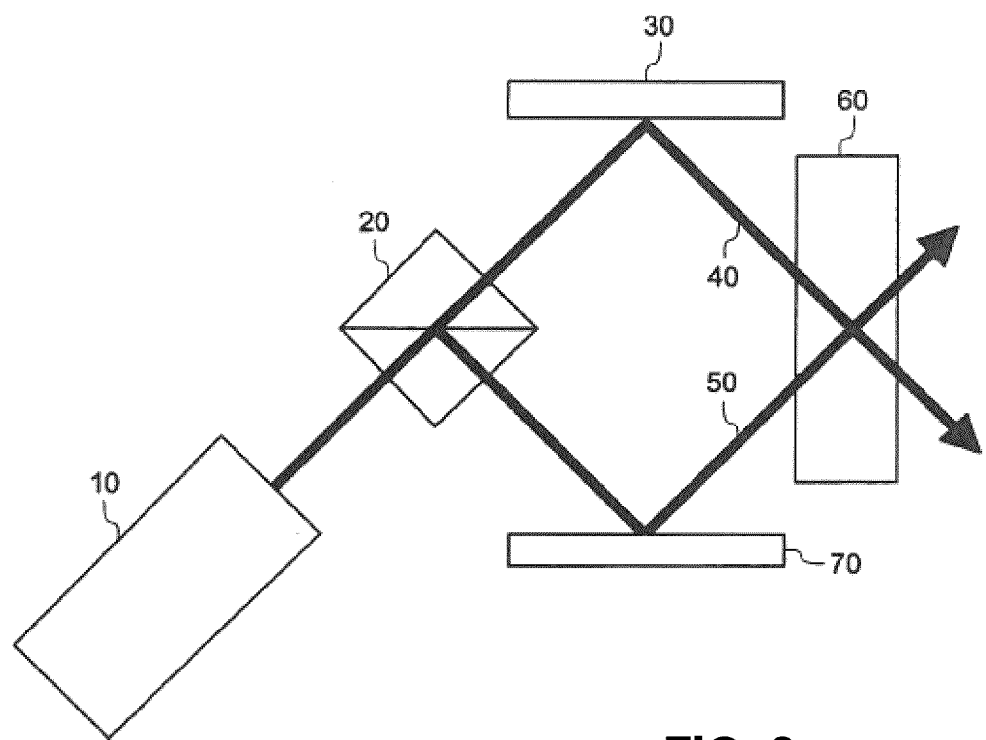
FIG. 2 represents a simplified diagram of an apparatus for recording a transmission hologram.

The interference fringe pattern may be recorded in the holographic medium by any of a number of exposure set-ups. Transmission interference fringe patterns may be recorded by directing the two interfering light sources onto the same surface of the storage medium. A simplified diagram of an exemplary embodiment of an apparatus for recording a transmission fringe pattern is shown in FIG. 2. In this configuration, the output from a laser 10 is divided into two equal beams by beam splitter 20. One beam 40 is incident on the storage medium 60 after reflection off of mirror 30. The second beam 50 is transmitted to storage medium 60 by reflection off first mirror 70 with minimal distortion. The two beams are coincident on the same area of storage medium 60 at different angles. The net result is that the two beams create an interference pattern at their intersection in the storage medium 60. Reflection interference fringe patterns may be recorded in similar fashion, except using one or more additional mirrors to direct one of the beams onto the opposite side of the holographic recording medium.

After an interference fringe pattern is recorded into a holographic recording medium, the holographic recording medium is selectively exposed to actinic radiation to partially or fully bleach or otherwise remove selected portion(s) of the interference fringe pattern, by partially or fully reacting the remaining photoreactive dye, creating an area containing partially or fully photoreacted dye molecules, thereby producing a holographic image formed by the remaining areas of the interference fringe pattern. A variety of different types of actinic radiation may be used, including but not limited to ultraviolet, visible light, infrared light or a selected wavelength or wavelength band within the ultraviolet, visible, or infrared spectrum. Although the actinic radiation may be sufficient to bleach the photoreactive dye by substantially altering its molecular structure, and such embodiments are included herein, the intensity of such radiation exposures may leave a visible mark (e.g., laser etch) apart from the holographic image, which may not be desirable. Moreover, actual bleaching is not necessary as the actinic radiation only has to disrupt the interference fringe pattern, which can be carried out by partially or fully exposing the dye in the selected portions. Thus, in some exemplary embodiments, the actinic radiation may be in the wavelength range to which the photoreactive dye is sensitive. Some exemplary dyes, which are selected because they do not impart significant visible coloration of their own to the holographic article, are sensitive to light in the violet to ultraviolet range of the spectrum. Therefore, in some aspects of such exemplary embodiments, the actinic radiation may be ultraviolet. In other aspects of such exemplary embodiments, the actinic radiation may be violet light. In other exemplary embodiments, other wavelengths or wavelength ranges of the visible light spectrum may be used, including but not limited to blue light, green light, red light. In still other exemplary embodiments, infrared light may be used.

The intensity and duration of exposure to actinic radiation needed to remove or deactivate the interference fringe pattern may vary depending on the dyes involved, wavelengths used, object thickness, coloration of intervening layers and other such factors. While the intensity and duration of exposure to actinic radiation may vary widely, it can be readily determined by one skilled in the art with simple experimentation and optimization of the processing conditions. Furthermore, as used herein, the terms "actinic radiation" and "light" are used interchangeably to refer to "actinic radiation", even though some of the actinic radiation wavelengths may fall outside the visible light spectrum.

Actinic radiation may be selectively applied to the interference fringe pattern formed by reacted and unreacted photoreactive dye for any of a variety of purposes, including but not limited to generating a holographic image, generating a decorative pattern or other shape or logo such as for display, advertising, aesthetic, artistic or secure identification purposes, or for storing information. In one exemplary embodiment, the actinic radiation may be projected through a patterning device. Exemplary patterning devices include, but are not limited to metalized or inked masks and/or filters (which may or may not contain gradients in opacity to manipulate features in the final hologram), physical masks, transmission or reflection master holograms, as well as adjustable and/or configurable optical control devices such as binary micro mirror-based light modulators, grayscale LCD spatial light modulators, or other optical control devices known in the art. The patterning device may be stacked onto the holographic recording medium or it may be disposed physically separated from the recording medium and disposed along the optical path between the actinic radiation source and the recording medium. A focused or coherent light source such as a laser or optically focused light source may be used with a patterning device (the term "mask" will be used below for ease of use, but it is understood that other patterning devices may be applicable as well), although it is not necessary to use a focused or coherent light source. Accordingly, in another exemplary embodiment, a continuous or incoherent light source such as a lamp or arc discharge light source may be projected through the mask or other patterning device. If the actinic radiation directed onto the recording medium does not cover an area sufficiently large to cover the unmasked portions of the recording medium, a scanning beam (defined as any movable projection of coherent or incoherent actinic radiation) may be used to cover the desired areas.

In another exemplary embodiment, the masked recording medium may be moved below a stationary projected actinic radiation source. If the projection of actinic radiation is not sufficiently large to cover the unmasked portions of the recording medium, the direction of motion of the recording medium may be varied as needed so that all desired areas are exposed to actinic radiation. In an exemplary embodiment where the masked recording medium is moved in a linear direction (e.g., for efficiency of production), the projection of actinic radiation may be moved back and forth in a direction perpendicular to the direction of motion of the recording medium if it is not large enough to cover the unmasked portions of the recording medium.

A mask may be used, but it is not required if the actinic radiation is selectively applied by a focused or coherent actinic radiation source, such as a laser or optically focused actinic radiation source. In such an exemplary embodiment, a scanning focused or coherent actinic radiation beam may be used to selectively expose desired locations or areas of the holographic recording medium. Regular 2-dimensional x-y raster scanning may be used, or irregular (i.e., free-form) scanning may be used. In addition to or as an alternative to the use of a scanning actinic radiation beam, the holographic recording medium may be moved with respect to the location of a focused or coherent actinic radiation beam in order to selectively expose desired locations or areas of the holographic recording medium. In an exemplary embodiment where the recording medium is moved in a linear direction (e.g., for efficiency of production), the projection of actinic radiation may be moved back and forth in a direction perpendicular to the direction of motion of the recording medium (i.e., one-dimensional scanning).

A scanning beam (whether raster scanning, one-dimensional scanning, or free-form scanning, coherent or incoherent) may have motion imparted to it in a variety of ways well-known in the art, such as robotic control or hand control of the actinic radiation source. Also, in addition to being used as patterning devices as described above, optical control devices such as movable lenses or mirrors (including micromirrors, e.g., in binary micro-mirror array devices) may be used to impart motion to both coherent and incoherent light sources. Additionally, as is known in the art, the light source may be started and stopped, periodically blocked, or have its intensity varied while scanning to provide the desired exposure profile to the holographic recording medium.

In an exemplary embodiment, upon completion of the shape, pattern or image recording process, the holographic recording medium (and more specifically, the interference fringe pattern recorded therein) is stabilized towards further bleaching, removal or deactivation of the remaining interference fringe patterns through chemical stabilization techniques to prevent loss of hologram intensity (e.g., by chemically converting the unreacted photoreactive dye into a different form that is no longer light sensitive), or by physical stabilization techniques (e.g., by protecting the holographic recording medium with a protective layer that absorbs light in the wavelengths to which photoreactive dye is sensitive). Exemplary stabilization techniques are disclosed in US patent application publ. no. 2010/0009269 A1, U.S. Pat. No. 7,102,802 B1 and U.S. patent application Ser. No. 13/028, 807 filed on Feb. 16, 2011, the disclosures of which are incorporated herein by reference in their entirety.

The techniques described herein may be used to provide multiple holographic images in an article. For example, discrete segments of holographic recording media may be disposed in an article and have interference fringe patterns recorded therein, which may then be subjected to partial or full bleaching, removal, or otherwise partially or fully deactivating the photoreactive dye to produce multiple holographic images in the article. In an alternative exemplary embodiment, a single area of holographic recording medium may have an interference fringe pattern recorded therein, and then discrete segments of the fringe pattern can each be subjected to partial or full bleaching, removal, or otherwise partially or fully deactivating the fringe pattern to produce multiple holographic patterns, shapes or images in the article. In other exemplary embodiments, interference fringe patterns may be spatially or angularly multiplexed in the same area of the article (either occupying the same space in the holographic recording medium or in overlying layers of holographic recording media) to produce multiple fringe patterns that display different colors or that display at different angles. In such embodiments, a single operation of selective partial or full bleaching, removal, or otherwise deactivating the photoreactive dye can produce multiple holographic images such as multicolor holographic images or holographic images that display at a variety of angles. The above-mentioned spatially and angularly multiplexed holograms may (in a single article)

have the same or different optical characteristics, such as recording and viewing geometries that can lend unique optical characteristics to the holograms recorded in different areas of the holographic article. For example, reflection holograms (of different colors) and transmission holograms may be recorded in the same holographic film or the same holographic article. Holograms recorded in the same holographic film or article may also have different intensities, angles of view, peak wavelengths, or requirements for viewing (e.g., covert holograms requiring the use of a prism to view or overt holograms viewable without the assistance of a prism).

The techniques described herein may be used to provide enhanced production efficiency for volume hologram production, such as for mass production of volume holograms. In an exemplary embodiment, the operation of exposing the holographic recording medium to a plurality of coherent light sources to form an interference fringe pattern, which as described above can require expensive equipment and tight control on operating parameters, can be centralized at one or more locations to reduce costs and provide enhanced efficiencies of scale. The operation of partially or fully selectively bleaching or otherwise removing or deactivating the photoreactive dye molecules can then be performed at one or more different locations. For example, the operation of partially or fully selectively bleaching or otherwise removing or deactivating the photoreactive dye can then be performed at a number of decentralized locations or customer sites with less expensive equipment and less rigorous control of operating parameters. If information used for customization or personalization of the holograms (e.g., photographic images such as personnel photos, badge numbers, customer logos) is maintained at these decentralized locations or customer sites, then efficiency is further enhanced since the expensive equipment and processing needed for exposing the holographic recording medium to form interference fringe patterns need not be maintained and operated at a relatively large number of decentralized sites.

It is understood that modifications of the various embodiments of this invention are also included within the description of the invention provided herein. Accordingly, the following example is intended to illustrate but not limit the present disclosure.

EXAMPLE 1

A series of "blank" rectangular holograms (i.e., interference fringe fields) were recorded in 600 micron thick polycarbonate discs containing 1.5% w/w N-(3-phenylallylidene) propan-2-amine oxide (ePhNIP dye) dye using a 405 nm laser used to form a rectangular-shaped area of transmission holographic interference fringe pattern. A beam splitter was used to split the laser beam into two beams, a signal beam and a reference beam. A spatial light modulator was used to encode an image of a rectangle onto the signal beam, which was then imaged onto to the front surface of the holographic recording medium through a series of mirrors and lenses at an angle of incidence of 5.1°. The reference beam was expanded using a series of lenses so that it would completely cover the rectangular image area of the signal beam, and exposed onto the front surface of the holographic recording medium at an angle of incidence of 38.8°. A 532 nm laser (which would not have a significant photoreactive effect on the photoreactive dye) was directed through a series of lenses and mirrors onto the front of the holographic recording medium to monitor the formation of the hologram being recorded by monitoring the diffraction efficiency of the hologram during recording with a green signal detector on the back side of the holographic recording medium. When the diffraction efficiency reached its peak (about 250-300 seconds), the recording was stopped, yielding the brightest possible hologram.

Figure 3A:
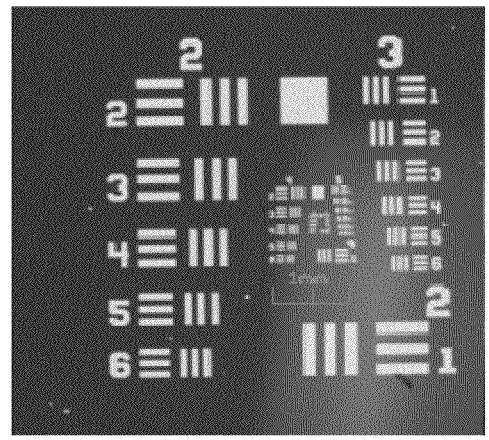
FIGS. 3A and 3B represent an image of a portion of a metalized glass mask, and a corresponding portion of a holographic image produced using the mask, respectively.
Figure 3B:
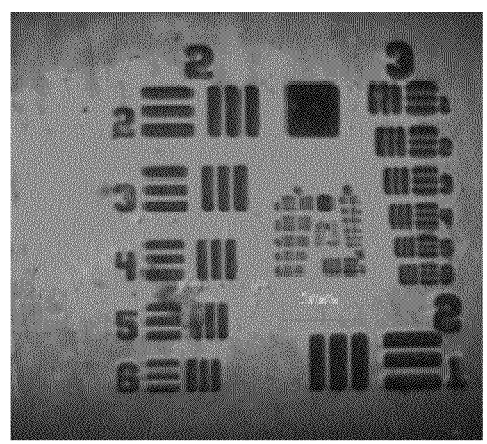
Figure 4A:
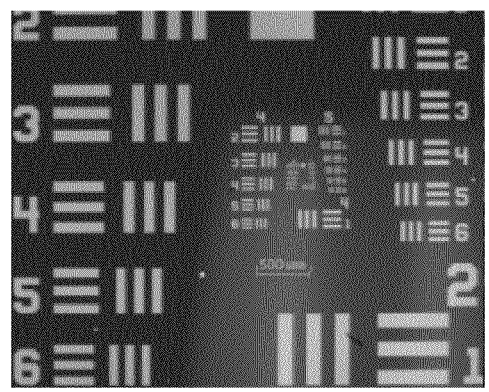
FIGS. 4A and 4B represent an image of a portion of a metalized glass mask, and a corresponding portion of a holographic image produced using the mask, respectively.
Figure 4B:
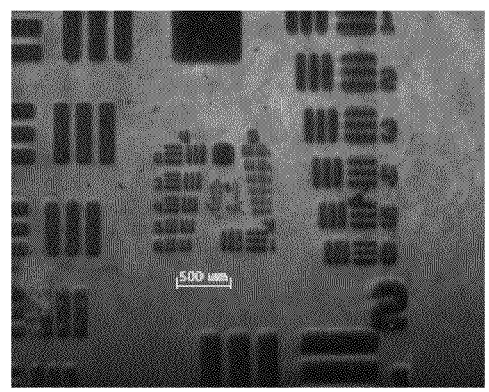
Figure 5A:
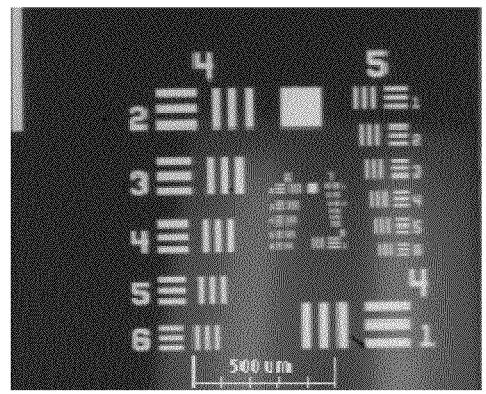
FIGS. 5A and 5B represent an image of a portion of a metalized glass mask, and a corresponding portion of a holographic image produced using the mask, respectively.
Figure 5B:
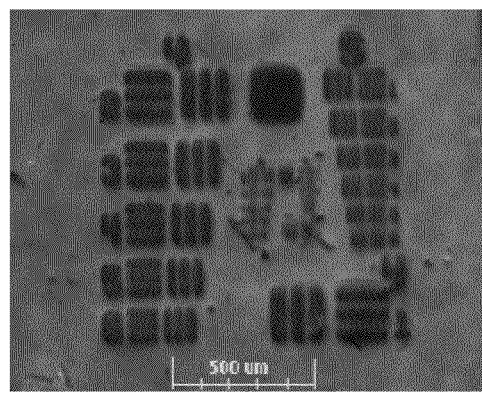

The as-formed interference fringe fields were then placed beneath a mask (metalized glass U.S. Air Force 1951 Resolution Target, shown at different magnification levels in FIGS. 3A, 4A, and 5A) and exposed to an Electro-Lite ELC-410 Light Curing System UV light source for 10 minutes. The recorded interference fringe field was erased in all of the unmasked areas, and remained vivid in the masked areas. The hologram was then imaged in transmitted reflection mode (i.e. a transmission hologram with a mirror beneath it) to reveal the resulting pattern (FIGS. 3B, 4B, and 5B). As shown in FIGS. 3B, 4B, and 5B, the resulting patterned hologram (displayed using a broadband (white) light source) exhibited very high contrast and very sharp edge features with resolutions below 100 μm line-width.

EXAMPLE 2

Figure 6A:
FIGS. 6A and 6B represent a digital negative transparency used as a mask, and holographic positive image produced using the mask, respectively.
Figure 6B:
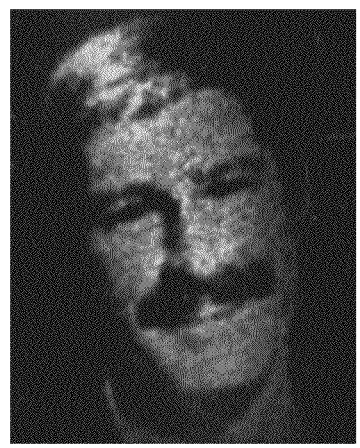

A "blank" hologram (i.e., interference fringe field) was created as in Example 1, and exposed to bleaching UV radiation as in Example 1. However, instead of the US Air Force Resolution Target, a negative grayscale image as represented by FIG. 6A was used to prepare the mask. The mask was prepared by printing the digital negative image depicted in FIG. 6A onto a transparency and placing it over the interference fringe field before exposure to the UV light source for 13 minutes. The resulting holographic image displayed using a broadband (white) light source is shown in FIG. 6B. As shown in FIG. 6B, the holographic image accurately captured grayscale facial detail from the original negative image.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention.

The invention claimed is:

1. A method of recording a volume holographic pattern, shape or image, comprising:
    exposing a holographic recording medium comprising a photoreactive dye to a plurality of interfering coherent light sources emitting light at a wavelength to which the photoreactive dye is sensitive to form interference fringes therein without a shape, pattern, or image, the interference fringes formed by photoreacted areas of the photoreactive dye and unreacted areas of the photoreactive dye; and
    partially or fully bleaching, removing, or deactivating the photoreactive dye fringes in selected areas of the holographic recording medium by exposing the selected areas of the holographic recording medium to actinic radiation, thereby producing the holographic pattern, shape or image formed by portions of the holographic recording medium where fringes were not bleached, removed, or deactivated and portions of the holographic recording medium where fringes were bleached, removed, or deactivated.

2. The method of claim 1, wherein the coherent light sources emit light with a wavelength within the range from 300 nm to 1000 nm.

3. The method of claim 1, wherein the actinic radiation is UV, visible or IR light radiation.

4. The method of claim 1, wherein the interference fringes generate a volume reflection hologram.

5. The method of claim 1, wherein the interference fringes generate a volume transmission hologram.

6. The method of claim 1, wherein a mask is used to partially or fully protect portions of the photoreactive dye fringes from exposure to the actinic radiation to partially or fully bleach, remove, or deactivate the photoreactive dye fringes in selected areas.

7. The method of claim 6, wherein incoherent actinic radiation is directed onto the holographic recording medium through the mask to partially or fully bleach, remove, or deactivate the photoreactive dye fringes in selected areas.

8. The method of claim 6, wherein a scanning actinic radiation beam is directed onto the holographic recording medium through the mask to partially or fully bleach, remove, or deactivate the photoreactive dye fringes in selected areas.

9. The method of claim 1, wherein a scanning actinic radiation beam is directed onto portions of the holographic recording medium to partially or fully bleach, remove, or deactivate the photoreactive dye fringes in selected areas.

10. The method of claim 9, wherein the scanning path of the actinic radiation beam is controlled with manual or automated mechanical control.

11. The method of claim 9, wherein the scanning actinic radiation beam is a laser beam.

12. The method of claim 9, wherein a scanning actinic radiation beam is directed onto portions of the holographic recording medium to partially or fully bleach, remove, or deactivate the photoreactive dye fringes in selected areas.

13. The method of claim 1, wherein the holographic recording medium is moved under an actinic radiation source to expose portions of the fringes to actinic radiation to partially or fully bleach, remove, or deactivate the photoreactive dye fringes in selected areas.

14. The method of claim 13, wherein a mask is moved along with the holographic recording medium in fixed position with respect to the holographic recording medium to partially or fully protect portions of the photoreactive dye fringes from exposure to the actinic radiation to partially or fully bleach, remove, or deactivate the photoreactive dye fringes in selected areas.

15. The method of claim 13, wherein projected actinic radiation from the actinic radiation source is moved with respect to the holographic recording medium to expose portions of the fringes to actinic radiation to partially or fully bleach, remove, or deactivate the photoreactive dye fringes in selected areas.

16. The method of claim 15, wherein the holographic recording medium is moved in a linear direction while the actinic radiation source is scanned along an axis perpendicular to the direction of motion of the holographic recording medium.

17. The method of claim 13, wherein the scanning actinic radiation source is a laser.

18. The method of claim 1, wherein an optical control device is used to project a pattern, shape or image onto the holographic medium to expose portions of the fringes to actinic radiation to partially or fully bleach, remove, or deactivate the photoreactive dye fringes in selected areas.

19. The method of claim 1, wherein the photoreactive dye is selected from the group consisting of nitrones, dinitrostilbenes, and diarylethylenes.

20. The method of claim 1, wherein the holographic recording medium includes a plurality of spatially, and/or angularly multiplexed fringes with the same or different optical characteristics.

21. The method of claim 20, wherein multiple areas in the plurality of photoreactive multiplexed dye fringes are exposed to actinic radiation in selected areas to partially or fully bleach, remove, or deactivate to produce multiple holographic patterns, shapes or images with the same or different optical characteristics.

22. The method of claim 1, wherein exposing the holographic recording medium to a plurality of coherent light sources to form interference fringes is performed at a different location than the location at which the partially or fully selectively bleaching, removing, or deactivating the photoreactive dye fringes is performed to produce a holographic pattern, shape or image.

23. The method of claim 1, further comprising stabilizing the photoreactive dye towards further actinic radiation exposure to prevent further bleaching, removal or deactivation of the holographic fringes.

24. The method of claim 1, wherein the holographic recording medium comprises a photoreactive dye dispersed in a polymer binder.

25. The method of claim 1, wherein the actinic radiation is UV radiation.

26. A method of recording a volume holographic pattern, shape or image, comprising:
exposing a non-diffusion based holographic recording medium comprising a photorectative dye and a binder to a plurality of interfering coherent light sources emitting light at a wavelength to which the holographic recording medium is sensitive to form interference fringes therein without a shape, pattern, or image, the interference fringes formed by photoreacted areas of the holographic recording medium and unreacted areas of the holographic recording medium; and
partially or fully bleaching, removing, or deactivating the interference fringes in selected areas of the holographic recording medium by exposure of the selected areas of the holographic recording medium to actinic radiation, thereby producing the holographic pattern, shape or image formed by portions of the holographic recording medium where fringes were not bleached, removed, or deactivated and portions of the holographic recording medium where fringes were bleached, removed, or deactivated.

27. The method of claim 26, wherein the holographic recording medium comprises the photoreactive dye dispersed in a polymer binder.

28. The method of claim 26, wherein the actinic radiation is UV radiation.

* * * * *